J. F. FOX.
HOLLOW AXLE WHEEL.
APPLICATION FILED JULY 14, 1919.
1,359,683.
Patented Nov. 23, 1920.
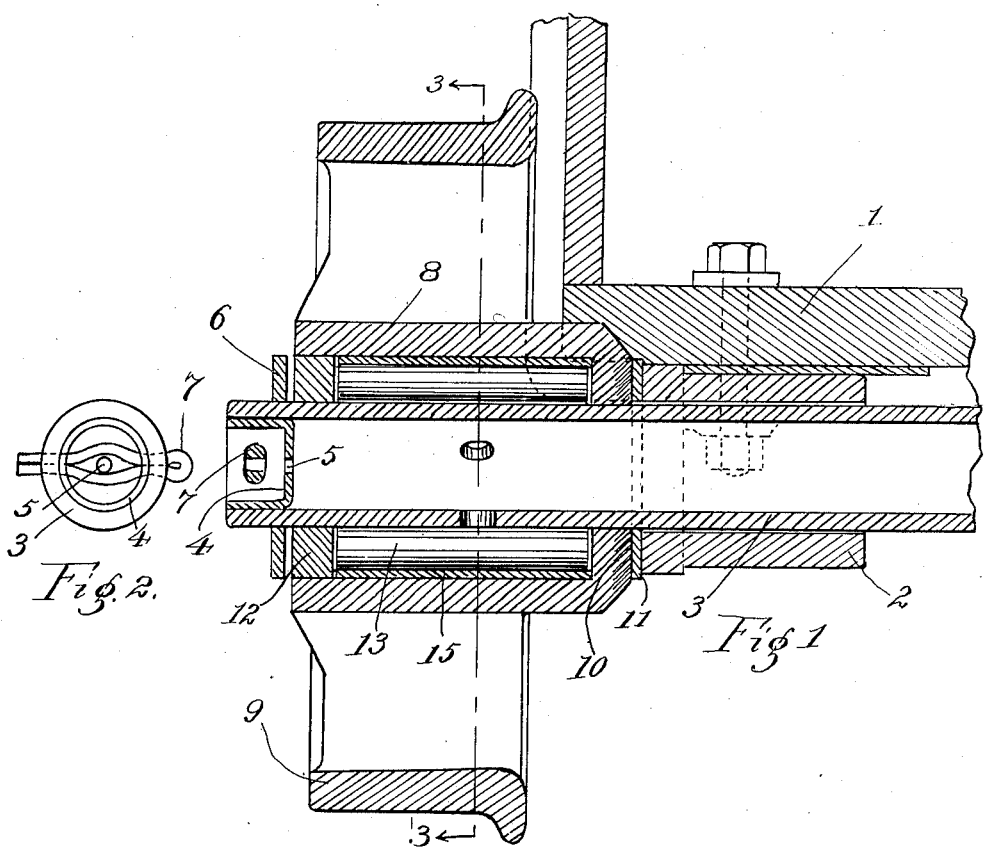
Fig. 2.
Fig. 1.
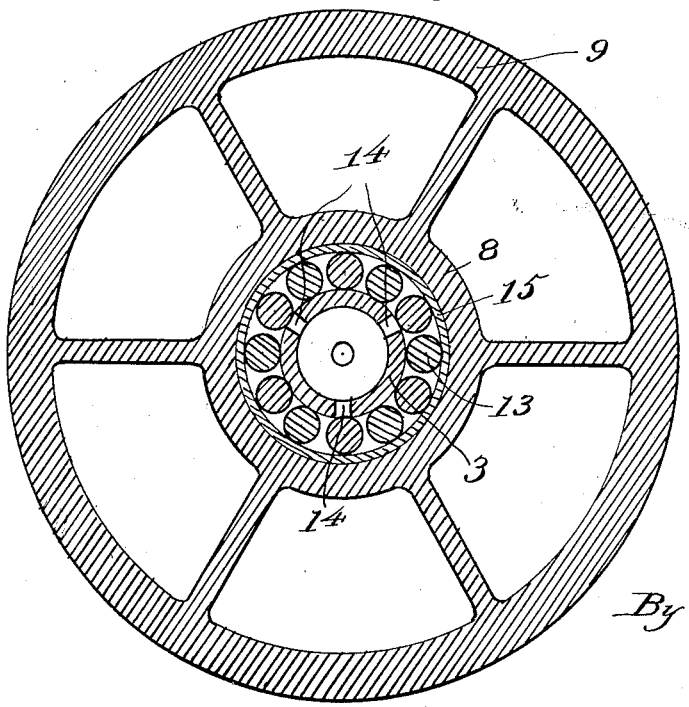
Fig. 3.
Inventor:
John F Fox
By
Allen & Allen
Attorneys.

UNITED STATES PATENT OFFICE.

JOHN F. FOX, OF BIRMINGHAM, ALABAMA, ASSIGNOR TO SOUTHERN WHEEL COMPANY, OF ST. LOUIS, MISSOURI, A CORPORATION OF GEORGIA.

HOLLOW-AXLE WHEEL.

1,359,683.   Specification of Letters Patent.   Patented Nov. 23, 1920.

Application filed July 14, 1919. Serial No. 310,622.

*To all whom it may concern:*

Be it known that I, JOHN F. Fox, a citizen of the United States, and a resident of Birmingham, in the county of Jefferson and State of Alabama, have invented certain new and useful Improvements in Hollow-Axle Wheels, of which the following is a full, clear, and exact description, reference being had to the accompanying drawing, forming part of this specification.

My invention relates to hollow axle wheels, wherein the axle itself is a chamber for the reception of the grease, and from which the wheel hub on said axle receives the grease in a radial direction, and the hub distributes it centrifugally to the bearing surfaces. It has particular relation to the use of a hollow axle and a roller bearing wheel thereon, said rollers acquiring their grease by the motion of the wheel and by gravity from the axle.

I am aware that it is customary to supply grease to ball or roller bearing wheels by means of grease cups, and also by means of hollow hub caps which act as grease cups, and force the grease to the bearings by means of pressure applied in the turning up of the hubs. In all such instances, the grease is not supplied in a radial direction, nor is there any relative motion of the grease carrying element and the hub of the wheel.

In my construction, however, it is my purpose to provide an axle and wheel which are relatively movable, and both of which are preferably movable, and to supply the grease preferably through restricted openings distributed about the axle, in a radial direction to and along the median line of the bearings. As will be noted, also, my invention has particular application to car wheels, such as are used in mine cars and the like.

I accomplish my objects above noted and other advantages which I will describe by that certain construction and arrangement of parts to be hereinafter more specifically pointed out and claimed.

In the drawing,

Figure 1 is a central vertical section through a mine car wheel and axle.

Fig. 2 is a detail end elevation of the axle closure.

Fig. 3 is a vertical cross section taken through the axle and wheel, on the line 3, 3, of Fig. 1.

The car body is indicated at 1, as having the axle boxes 2. The axle 3 is rotatably and preferably slidably held in the boxes, and is made in the form of a hollow tube, the hollow interior of the axle preferably extending the full length thereof.

As closure for the tube I provide metal cups 4, which are driven into the ends of the axles, and have a central aperture 5 to permit of the insertion of a grease gun for filling the axle with grease. To lock the cups in place and retain the wheels in place, there are supplied steel washers 6, which fit over the axle ends, and the cups and washers are held in place by a cotter pin 7 passing through the axle and the cups, outside of the washers. This cotter pin is spread at the center to leave free access to the grease hole 5.

The wheels themselves have hubs 8 and rims 9. The inner ends of the hubs are formed so as to seat on the axle and have their exposed faces chilled, as at 10, in order to bear against steel washers 11, which are themselves set over the axle between the wheel hubs and the axle boxes.

The inside of the wheel hubs is preferably lined, as at 15, and the outer end closed by a cast-iron ring 12, which fits the axle loosely. This construction leaves a chamber for the insertion of the rollers 13, which are set into their chamber when the wheel is being mounted.

The chamber and the rollers are so set that the center of the rollers is in line with the " gage line " of the rails over which the wheels are to run. The axle is pierced with holes 14, preferably three in number, spaced equidistantly, and positioned so that they lead into the roller raceway at the median line of the rollers.

As a result of this construction, the wheel is free to revolve on the axle, and the axle itself is free to occasionally creep around in the axle boxes. The grease in the axle feeds out by gravity and by the agitation of the axles due to bumping of the wheels over rail joints, and probably in part to the endwise motion of the wheels on the axle.

The grease flows through the holes in the axle to the rollers preferably at the center of the bearing surface thereof, and lubricates first the axle surface or inner roller raceway. The rollers and the motion of the wheel at once distribute the grease over the whole surface of the rollers and throughout the roller chamber. The bearing is thus fed with grease radially from within the axle, and the grease is spread to the bearing surfaces of the rollers, the axle and the wheel hub, by means of the action of the rollers and the revolution of the wheel hub. Furthermore the grease is fed to the inside of the bearing, preferably near the center, in a continuous flow, energized by the agitation of the axle, the endwise motion of the wheel and wiping action of the rollers on the body of the grease in the holes on the underside of the axle.

But one hole in the axle would not be sufficient, unless the axle itself were held rigid in the axle boxes, since if the single hole came uppermost, the grease would not feed properly. I employ three holes of the relative size shown, because I have found that best lubrication results from the use of a grease for the hollow axle which will flow sufficiently through holes of the size, number and distribution shown.

Having thus described my invention, what I claim as new and desire to secure by Letters Patent, is:

1. In combination with a hollow axle element adapted to contain grease and journal bearings therefor in which the axle is free to turn, a wheel revoluble on said axle, a roller bearing for said wheel, and said hollow axle element having holes therethrough for passageway of grease therefrom to the inside of the bearing.

2. In combination, a hollow axle element adapted to contain grease and journal bearings therefor in which the axle is free to turn, a wheel mounted revolubly thereon, a roller bearing chamber for said wheel bearing on said axle, and said hollow axle element having holes therethrough leading into the roller bearing chamber, whereby grease is radially supplied to the inside of said chamber.

3. In combination, a hollow axle element and journal bearings therefor in which the axle is free to turn, a wheel mounted revolubly thereon, rollers within the wheel bearing on the axle, and said hollow axle element having holes therethrough leading to the bearing surface of the rollers, said holes being directed substantially at the center of the bearing surface of the rollers.

4. In combination, a hollow element adapted to contain grease, a hub element thereon, said hollow element and hub element independently rotatable, and said hollow axle element having holes therethrough for a passageway for grease therefrom into the interior of the hub element intermediate its bearing surface.

5. In combination with a hollow element adapted to contain grease and journal bearings in which the axle is free to turn, flanged wheels rotatable thereon independently of each other and having rollers set therein for bearing on said axle element, said rollers placed so as to center on the gage line of the wheels, and said hollow element having grease holes to the rollers, spaced around the said axle, and also on the gage line of the said wheels.

JOHN F. FOX.